US006527436B1

(12) United States Patent
Ng

(10) Patent No.: US 6,527,436 B1
(45) Date of Patent: Mar. 4, 2003

(54) WATCH

(75) Inventor: Albert Pun Tak Ng, Kwai Chung (HK)

(73) Assignee: Innomind International Limited, New Territories (HK)

(*) Notice: Subject to any disclaimer, the term of this patent is extended or adjusted under 35 U.S.C. 154(b) by 0 days.

(21) Appl. No.: 09/625,951

(22) Filed: Jul. 26, 2000

(51) Int. Cl.[7] ........ G04G 17/00

(52) U.S. Cl. ........ 368/321; 368/319; 368/320; 368/69

(58) Field of Search ........ 368/319, 320, 368/321, 69, 70, 41

(56) References Cited

U.S. PATENT DOCUMENTS

| | | | | | |
|---|---|---|---|---|---|
| 4,115,993 A | * | 9/1978 | Moriya | ........ | 368/321 |
| 4,379,642 A | * | 4/1983 | Meyrat | ........ | 368/321 |
| 4,395,134 A | * | 7/1983 | Luce | ........ | 368/319 |
| 4,423,966 A | * | 1/1984 | Ogihara et al. | ........ | 368/320 |
| 4,600,316 A | * | 7/1986 | Besson | ........ | 368/69 |
| 4,720,823 A | * | 1/1988 | Terizian | ........ | 368/69 |
| 5,477,508 A | * | 12/1995 | Will | ........ | 368/69 |

FOREIGN PATENT DOCUMENTS

| | | | |
|---|---|---|---|
| CH | 608328 | * 12/1979 | ........ 368/321 |

* cited by examiner

*Primary Examiner*—David Martin
*Assistant Examiner*—Jeanne-Marguerite Goodwin
(74) *Attorney, Agent, or Firm*—Rabin & Berdo, P.C.

(57) ABSTRACT

A watch has a switch mechanism 10 supported by a base 11 and a lid 13 that houses a generally conventional electric watch arrangement (not shown). The mechanism includes a semi-circular disc shaped finger tip engagable pusher 16 that can be rotated in either direction from a mean position, and also pushed radially inwards. Such movement of the pusher 16 produces radial movements of biassed plungers 23, 26 and 30 that are urged through respective apertures 24, 27 and 31 in a wall 12 of the base 11. As a result respective electrical circuits of the watch arrangement are closed to change watch functions. The mechanism 10 serves the same purpose as push buttons conventionally used in the prior art but is much easier for the user, especially if the watch is being worn on a wrist when watch functions need to be changed.

6 Claims, 1 Drawing Sheet

WATCH

BACKGROUND OF THE INVENTION

1. Field of the Invention

The invention relates to a watch.

2. Description of Prior Art

The invention relates particularly but not exclusively to electronic wrist watches. Watches, especially relatively small watches worn on a wrist or carried on a hanging strap, have manually operable push buttons switches to control functions of the watch including altering the time-of-day display. Generally stated, it is difficult to apply pressure to individual buttons as required because of the small area of pressure contact or relative disposition, especially when the watches are being worn by the user of the buttons.

SUMMARY OF THE INVENTION

It is an object of the invention to overcome or at least reduce this problem.

According to the invention there is provided a watch having a multiple electrical switch arrangement and a hollow casing for receiving a watch, the switch arrangement comprising a disc shaped finger tip engagable pusher rotatable mounted adjacent a side of the casing about a mean rotational position, with an outer peripheral surface that conforms generally to an outer peripheral surface of the casing, biassing means to bias the pusher to the mean position, including at least two separate electrical contacts that are urged to close respective electrical circuits whenever the pusher is rotated clockwise and anti-clockwise, respectively.

The pusher is preferably loosely pivotably supported to allow radial movement, in a direction towards and away from a centre of the casing, biassing means to bias the pusher radially outwards, and a third electrical contact that is urged to close a respective electrical circuit whenever the pusher is manually moved radially inwards.

The pusher preferably has a semi-circular cross-section.

The semi-circular periphery is preferably serrated.

The casing preferably encloses the mechanism except for a partially exposed peripheral surface of the pusher.

BRIEF DESCRIPTION OF THE DRAWINGS

A watch according to the invention will now be described by way of example with reference to the accompanying drawing which shows an exploded isometric view of the watch.

DESCRIPTION OF THE PREFERRED EMBODIMENT

Figure 1:
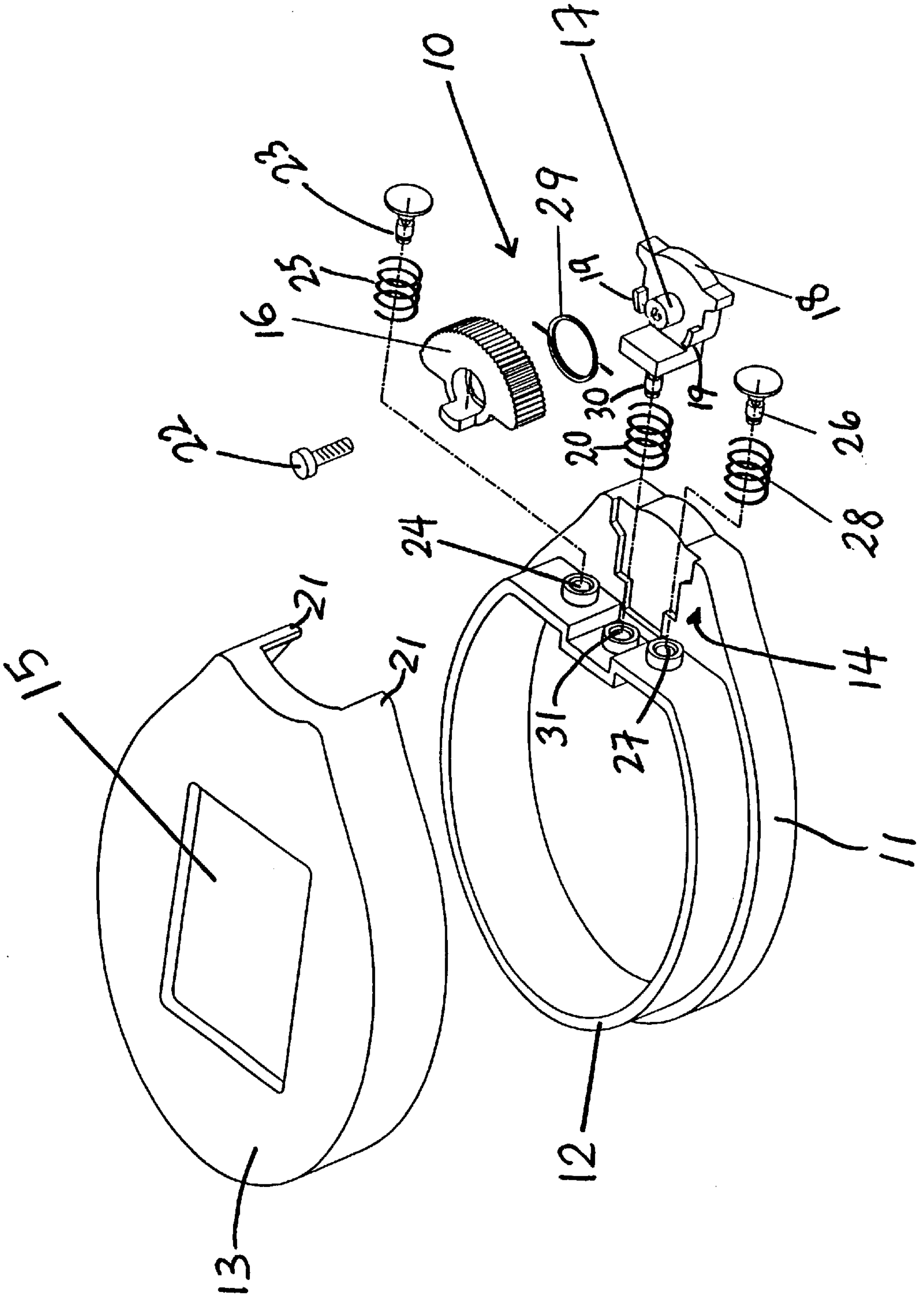

Referring to the drawing, the watch has a multiple electrical switch mechanism 10 and a hollow casing consisting of a base 11 with an upstanding peripheral wall 12 over which a lid 13 fits. The base 10 has an integrally formed platform 14 at one side over which the lid extends to enclose the mechanism 10.

An electronic watch arrangement (not shown) fits into the casing and has a face, usually an LCD, that is visible through a window 15 formed in the lid 14. Suitable watch arrangements can be of a wide variety of types and driven by a battery normally housed inside the casing. The various watch arrangements are capable of responding to manually operable electrical switches in a manner very well understood and already in wide use. Such switches are normally responsive to a number of push buttons mounted to the base or to the lid that selectively close electrical circuits of the watch arrangement to enable the user to carry out different functions as required. In embodiments of the present invention the push buttons are, in effect, "replaced" by the mechanism 10 described below.

The mechanism 10 includes a semi-circular disc-shaped finger tip engagable pusher 16. The pusher is rotatable on a vertical stub axle 17 that is integrally formed on a sliding plate 18 supported on the platform 14. The plate is shaped with stops 19 to restrict relative rotational movement of the pusher, and allow certain radial slidable movement of the plate, with respect to a center of the base 11. The plate 18 is biassed radially outwards by a spring 20 and the plate 18 is entraped radially by edges 21 of the lid 13 in use, that is when the lid 13 is fitted over the base 11. The pusher 16 is held down on the axle 17 by a screw 22.

When the watch is assembled, a serrated peripheral edge of the pusher 16 is partially exposed out of a side of the lid, between the edges 21, so that a finger tip can rotate the pusher 16 as required. If the pusher is rotated anti-clockwise, a first plunger 23 is urged through a first aperture 24 in the wall 12 to make a first electrical contact or close a first electrical circuit (not shown) of the watch arrangement. A spring 25 biasses the pusher 16 in a clockwise direction.

Likewise, if the pusher 16 is rotated clockwise, a second plunger 26 is urged through a second aperture 27 in the wall 12 to close a second electrical circuit (not shown). A spring 28 biasses the pusher 16 in an anti-clockwise direction.

It will be appreciated that the springs 25 and 26 act together to normally bias the pusher 16 towards a null or mean rotational position. However, a simple coil spring 29 ensures that the pusher 16 remains in the mean position in the absence of any pressure being applied to the pusher.

A third electrical circuit (not shown) can be closed by a third plunger 30, fixed to the plate 18, that is urged through a third aperture 31 in the wall 12 whenever the pusher 18 is pushed radially inwards against the bias of the spring 20.

In this way the mechanism 10 can provide at least three distinct electrical operations by simple finger tip pressure to cause appropriate movements of the pusher 18. It will be appreciated that a further two electrical operations can be achieved by simultaneously pressing the pusher inwards radially while rotating the pusher anti-clockwise or clockwise, respectively. In the latter cases, the plunger 29 and either the plunger 23 or the plunger 26 are urged through the respective apertures at the same time so that two respective electrical circuits are closed simultaneously.

In the described embodiment, the plungers 19, 23 and 26 are electrically non-conductive and are used to operate closable contacts (not shown) of the watch arrangement, in a simple manner well understood by skilled artisans. It is possible however to make the plunger electrically conductive, and also make the pusher conductive if required, so that the plungers, and the pusher if appropriate, form part of conductive paths that serve to close when the pusher 14 is manually moved as described. In all cases, the mechanism 10 can be arranged to serve the purpose of selectively closing electrical circuits of the watch arrangement to perform desired different watch functions using only simple finger tip manipulations. This can be done in a manner that is more easily selectable by a watch wearer that using an array of small push buttons currently provided for similar watch arrangements.

I claim:

1. A watch having a multiple electrical switch arrangement and a hollow casing for receiving a watch mechanism, the casing having first and second apertures, said switch arrangement comprising:

a first plunger which is aligned with the first aperture in the casing;

a second plunger which is aligned with the second aperture in the casing;

a pusher member that is shaped generally as a segment of a disc, the pusher member being mounted adjacent a side of the casing and being manually pivotable clockwise or counterclockwise from a mean rotational position, the pusher member having a first portion which engages the first plunger when the pusher member is pivoted counterclockwise and a second portion which engages the second plunger when the pusher member is pivoted counterclockwise;

biassing means for biassing the pusher member to the mean position; and at least two separate electrical contacts that are urged by the first and second plungers to close respective electrical circuits whenever the pusher is rotated clockwise and counterclockwise, respectively.

2. A watch according to claim 1, wherein the casing additionally has a third aperture, and further comprising:

a plate member which is slidably mounted on the casing and which pivotably supports the pusher member, the plate member having a third plunger which is aligned with the third aperture in the casing;

further biassing means for biassing the pusher member radially outwards; and a further electrical contact that is urged by the third plunger to close a respective electrical circuit whenever the pusher member is manually moved radially inwards.

3. A watch according to claim 1, wherein the pusher member has a substantially semi-circular cross-section.

4. A watch according to claim 1, wherein the pusher member has a periphery with a semi-circular portion that is serrated.

5. A watch according to claim 1, in which the casing encloses the first and second plungers, the biassing means, and the electrical contacts, and also encloses the pusher member except for a partially exposed peripheral surface of the pusher member.

6. A watch according to claim 1, wherein the first and second apertures in the casing have substantially cylindrical surfaces and the first and second plungers have substantially cylindrical surfaces which slidably engage to substantially cylindrical surfaces of the apertures.

* * * * *